Patented Jan. 14, 1936

2,027,722

UNITED STATES PATENT OFFICE 2,027,722

THERAPEUTIC AGENT

Harold Sheely Diehl, Minneapolis, Minn., assignor to Board of Regents of University of Minnesota, Minneapolis, Minn., a corporation of Minnesota No Drawing. Application April 4, 1934,
Serial No. 719,038

6 Claims. (Cl. 167—67)

It is the object of my invention to produce a therapeutic agent which is highly effective in the treatment of certain diseases, especially the treatment of coryza.

This application is a continuation in part of my copending application Serial No. 682,888, filed July 29, 1933.

Extensive treatment of coryza, and of certain other diseases, under controlled conditions, has disclosed that codeine and its salts, and papaverine and its salts, are beneficial individually in some cases; but that a mixture of codeine or a salt of codeine with papaverine or a salt of papaverine is highly beneficial, and beneficial in a much higher percentage of cases than are the individual ingredients alone. In addition, I have found that the preparation containing both codeine and papaverine, or their salts, is materially less toxic than is the codeine alone which is in the mixture. In other words, by adding papaverine or its salts to codeine or its salts, I reduce the toxic effect of a given dosage of codeine, in addition to increasing the beneficial effects over that obtained by either ingredient alone. Thus there is synergism from both aspects.

Either or both the codeine and the papaverine may be in the form of the alkaloid; or either or both may be in the form of a salt. Among the salts which may be used are the sulphate, phosphate, citrate, hydrochloride, hydrobromide, salicylate, and nitrate; and of these I prefer the sulphate or the phosphate for codeine, and the hydrochloride for papaverine.

No particular proportions of the two ingredients is necessary. The best results which I have obtained are those where the two ingredients are mixed in about equal proportions by weight, but good results may be obtained with either ingredient three or four times as large by weight as is the other ingredient.

One mixture which I have found highly effective is of codeine sulphate and papaverine hydrochloride, in equal parts by weight. This may be put up for oral administration in any convenient form, such as tablets, capsules, simple powder, or solutions. Effective dosages are from about one-fourth grain to about one grain of the mixture, administered several times a day; although the dosage may vary widely.

The following tables show the synergy, by certain comparative results which have been obtained in the treatment of acute coryza with codeine sulphate alone, with papaverine hydrochloride alone, and with a mixture of codeine sulphate and papaverine hydrochloride. In Table I, the total results following medication are given. However, it is found that substantially 35% of the patients recover spontaneously; and so Table II is derived from Table I and shows the effects which are due to the medication, as obtained after deducting the 35% who recover spontaneously. In all cases recovery is counted only if it is substantially complete within twenty-four to forty-eight hours.

The dose given was one-half grain of the medicine, whether the medicine was a mixture of the codeine and papaverine salts, or the codeine salt or the papaverine salt alone; and the number of doses per day was varied in accordance with the weight of the individual, as follows:

75 to 99 pounds: 1 after breakfast; 2 at bedtime.

100 to 129 pounds: 1 after breakfast; 3 at bedtime.

130 to 169 pounds: 1 after breakfast; 1 after lunch; 3 at bedtime.

170 pounds and over: 1 after each meal, and, depending on weight, 3 or 4 at bedtime.

TABLE I

Results following medication, in cases of acute coryza

| Medication | Number of cases treated | Percentage of these reporting definite improvement or complete relief in 24 to 48 hours |
|---|---|---|
| Mixture, ½ grain (codeine sulphate ¼ grain; papaverine hydrochloride ¼ grain) | 605 | 71.4±1.3 |
| Codeine sulphate alone, ½ grain | 51 | 49.0±4.7 |
| Papaverine hydrochloride alone, ½ grain | 84 | 50.0±3.7 |

TABLE II

Results due to medication, after deducting from Table I the 35% who would have recovered spontaneously

| Medication | Number of cases treated who would not have recovered spontaneously; or total number minus 35% | Percentage of these reporting definite improvement or complete relief in 24 to 48 hours |
|---|---|---|
| Mixture, ½ grain (codeine sulphate ¼ grain; papaverine hydrochloride ¼ grain) | 393 | 56.0±1.8 |
| Codeine sulphate alone, ½ grain | 33 | 21.5±4.9 |
| Papaverine hydrochloride alone, ½ grain | 55 | 23.1±3.8 |

The probable error (±) in the percentage column represents that derived under the theory of probability.

These results, especially those of Table II, show clearly the marked advantage in the treatment of coryza by the use of the mixture over that obtained by the use of either ingredient alone.

Not only is there this advantage because of increased beneficial effect, but there is also the advantage already referred to of a decrease in the toxic symptoms of the codeine in the dose, as variously evidenced by vomiting, nausea, dizziness, faintness or fainting, "dopey" feeling, severe headaches, etc. This is shown in the following Table III, which represents results with dosages as in the Tables I and II.

TABLE III

*Toxic symptoms following medication*

| Medication | Total cases treated (acute coryza, sub-acute colds, pharyngitis, influenza) | Percentage of these reporting toxic symptoms after medication |
|---|---|---|
| Mixture, ½ grain (codeine sulphate ¼ grain; papaverine hydrochloride ¼ grain) | 1,083 | 3.4±0.3 |
| Codeine sulphate alone, ¼ grain | 103 | 12.6±2.3 |
| Codeine sulphate alone, ½ grain | 92 | 26.1±3.1 |
| Papaverine hydrochloride alone, ½ grain | 128 | 3.1±1.1 |

The foregoing tables represent tests made on a directly comparative basis; but they do not represent all the work that has been done, for mixtures of codeine or its salts with papaverine or its salts have been used in various doses and proportions in over a thousand individual cases of acute coryza among the students of the University of Minnesota, with beneficial results as indicated in the foregoing tables.

While the foregoing discussion of the beneficial effects of combining papaverine or its salts with codeine or its salts has been with particular reference to the treatment of coryza, and of similar manifestations in the common cold, the mixture has also been found to be of benefit in the treatment of other disturbed conditions, especially certain allergic conditions such as hay fever and asthma.

I claim as my invention:

1. A therapeutic agent consisting of a mixture of a salt of codeine with a salt of papaverine.

2. A therapeutic agent consisting of a mixture of codeine or its salts with papaverine or its salts, with either ingredient at least one-fourth as much by weight as is the other.

3. A therapeutic agent consisting of a mixture of codeine or its salts with papaverine or its salts, in approximately equal parts by weight.

4. A therapeutic agent consisting of a mixture of codeine sulphate and papaverine hydrochloride.

5. A therapeutic agent consisting of a mixture of codeine sulphate and papaverine hydrochloride, with either ingredient at least one-fourth as much by weight as is the other.

6. A therapeutic agent consisting of a mixture of codeine sulphate and papaverine hydrochloride, in approximately equal parts by weight.

HAROLD SHEELY DIEHL.